3,547,840
PRODUCTION OF INSULATING MATERIALS HAVING LOW SPECIFIC GRAVITY

Fritz Stastny, 3 Ottweiler Str., Ludwigshafen (Rhine), Germany; Rudolf Gaeth, 10 Weinbietstrasse, Limburgerhof, Pfalz, Germany; Bernhard Schmitt, 52 Keplerstrasse, Heidelberg, Germany; and Udo Haardt, 19 Beethovenstrasse, Ludwigshafen (Rhine), Germany
No Drawing. Continuation of application Ser. No. 555,681, June 7, 1966. This application Jan. 13, 1969, Ser. No. 793,226
Claims priority, application Germany, June 16, 1965, 1,671,654
The portion of the term of the patent subsequent to Feb. 25, 1986, has been disclaimed
Int. Cl. C08f 47/10; C08j 1/26
U.S. Cl. 260—2.5          10 Claims

ABSTRACT OF THE DISCLOSURE

Insulating materials having a low specific gravity are prepared by mixing closed cell porous polymer particles with an aqueous alkali metal silicate solution containing a substance which reacts with the alkali metal silicate to precipitate insoluble compounds and consolidating the mixture to form a compact molding.

---

This application is a continuation of application Ser. No. 555,681 filed June 7, 1966, now abandoned.

The present invention relates to a method for the production of insulating materials having low specific gravity.

It is known that building units having low specific gravity may be made by mixing small porous particles of thermoplastics having closed pores with binders containing water, shaping the mixtures and allowing them to set. The binders used may be the substances conventionally used in the building industry, such as cement, gypsum or mortar. Organic binders, for example aqueous solutions of adhesive or curable synthetic resins, for example urea-formaldehyde condensation products, may be used instead of the said inorganic binders. These organic binders have the disadvantage that they set only relatively slowly so that the production of these insulating materials requires a considerable period of time. Moreover, the insulating materials cannot withstand prolonged heating at very high temperatures, for example at 800° to 900° C. When organic binders have been used in their manufacture, they are burnt to a large extent. When the said inorganic binders are used, the mechanical cohesion of the insulating material is disrupted, for example by the cement becoming friable. Furthermore, these insulating materials have the disadvantage that when they have a low unit weight (i.e. when the proportion of porous plastics particles is very high) they have only low break resistance.

According to a prior proposal of ours which has not yet been published, insulating material having low specific gravity may be prepared by introducing expandable plastics particles into aqueous inorganic binders and consolidating the mixture, by using as binders aqueous solutions of alkali metal silicate, which may have solid water-containing alkali metal silicates suspended therein, and expanding these mixtures to form a homogeneous foam structure at a temperature above the softening point of the expandable plastics.

It is an object of the present invention to provide a novel method for the production of insulating materials which makes it possible to produce insulating materials within a short time. It is a further object of the present invention to provide insulating materials which, besides having low specific gravity and high break resistance, are capable of withstanding prolonged heating at very high temperatures, for example 1,000° C., without losing their insulating properties.

These objects are achieved by mixing porous plastics particles with an aqueous alkali metal silicate solution to which substances are added which are difficultly soluble or which hydrolyze in the alkali metal silicate solution and which react with the alkali metal silicates with precipitation of insoluble compounds and consolidation of the mixture to form a compact molding.

The individual components, namely the porous plastics particles, the alkali metal silicate solutions and the additives which react with the alkali metal silicates, are mixed together as homogeneously as possible in a mixing apparatus for the production of the mixtures. The single components are used in such amounts that a readily pourable relatively loose mixture is obtained which is as moist as earth and may be filled without difficulty into molds and the like for consolidation into compact moldings.

Examples of substances which will slowly react with the aqueous alkali metal silicate solutions with the precipitation of compounds which are insoluble in water, especially silicic acid, are tetrachlorophthalic acid, alkali metal borates, organic acid esters, for example propyl acetate, organic acid anhydrides, for example phthalic anhydride. It is particularly advantageous to use silicofluorides or borofluorides, especially silicofluorides or borofluorides of the alkali metals or alkaline earth metals, for example calcium silicofluoride, barium silicofluoride, sodium silicofluoride or magnesium silicofluoride, sodium or potassium borofluoride or zinc oxide as such substances. These substances are added to the mixtures in such an amount that at least 10%, particularly 50 to 100%, of the silicic acid content of the alkali metal silicates used is precipitated. Owing to their property of being difficultly soluble or of being hydrolyzed in the alkali metal solutions, these substances do not react immediately with the alkali metal silicates with the precipitation of insoluble silicic acid. It is therefore possible to conduct the mixing operation in such a way that when it is finished precipitation of the silicic acid is not yet complete. Obviously it is also possible to use mixtures of these substances, mixtures of alkali metal silicofluorides and zinc oxide having proved to be particularly advantageous. Insulating materials which have been prepared using these mixtures have particularly good properties as far as low water absorption, high mechanical strength and high thermal resistance at temperatures occurring in cases of fire is concerned.

Insulating materials having different specific gravities may be prepared by varying the amount of porous plastics particles added. If a very high proportion of these particles is chosen, for example up to 95% by volume, insulating materials are obtained having a unit weight of about 50 to 250 kg./cu. m. Obviously it is also possible to prepare insulating materials having a higher unit weight, e.g. of up to 600 kg./cu. m., and a correspondingly higher break resistance by decreasing the proportion of porous plastics particles.

Examples of porous plastics particles which may be used are those of polystyrene or styrene copolymers, for example copolymers of styrene and acrylonitrile, acrylic acid, butadiene and the like. These particles are prepared by a conventional method by heating particles of these plastics containing low boiling liquids or gases as expanding agents so that the particles are expanded. Porous plastics particles based on vinyl chloride or copolymers of vinylchloride and vinylidene chloride are also suitable. It is advantageous to add flame retardant compounds, for example inorganic halogen compounds or mixtures of chloroparaffin powder and antimony trioxide, to the porous plastics particles.

It is preferred to use solutions of sodium silicate or potassium silicate of as high a concentration as possible as the alkali metal silicate solutions so that the amount of water to be removed in drying is as small as possible. In general solutions will be used which have a commercial concentration of 38° Baumé. The molar ratio of sodium oxide:silicon dioxide in the alkali metal silicates may be from 1:1.2 to 1:3.8. The mixtures may contain fillers, for example talc, chalk, kaolin, glass powder or quartz powder, in addition to the said substances.

It is important that the components be mixed in a short time and if necessary with intense cooling, for example to a temperature of 5 to 20° C., in order to prevent setting during mixing. The mixtures formed are then immediately filled into molds or applied to an endless belt and left there until a hard composition which is resistant to compression has been formed. The said mixtures will set even at room temperature but in order to accelerate the setting process it is advantageous to heat the mixtures; the temperatures should however not exceed the softening point of the plastics particles used. Temperatures of 50° to 90° C. are usually sufficient for the setting process. Owing to the property of the mixtures of setting at room temperature, it is very simple to provide walls and the like with an insulating layer. For this purpose a wooden shuttering is applied to the wall to be insulated and the cavity between the shuttering and the wall is filled with a mixture according to this invention. In order to obtain insulating materials having particularly high resistance to compression, it is possible to compress the mixtures by about 10 to 90% of their original volume prior to their consolidation into moldings. This is particularly advantageous when mixtures are used which contain a very high proportion of porous plastics particles.

Insulating materials prepared according to this invention may be used for insulation against both cold and heat. If for example they are exposed to high temperatures, such as occur in cases of fire, their organic component burns, but there remains behind a porous and mechanically strong skeleton of the inorganic component contained therein which by reason of its structure offers considerable resistance to the passage of heat energy. Owing to the fact that, when using an excess of the additive beyond the amount stoichiometrically required for precipitation of the silicic acid, practically the whole of the silicic acid of the alkali metal silicates is precipitated and practically no alkali metal silicate can be detected in the finished insulating material, the material prepared according to this invention has only slight moisture or water absorption.

These properties make the insulating materials suitable for many applications in the building industry. Depending on their unit weight, they may be used as substitutes for other expanded plastics, fibrous insulating materials, cork, wooden boards, plastics boards, hard rubber, light stone panels and the like. They may provided in a simple way with coatings, for example of metal, plasterboard, plastics, plaster, wallpaper and the like. Composite materials may be prepared in this way which may be used for example as insulating and fire-retarding doors. Provided the insulating layers have a thickness of 15 mm. and a unit weight of about 200 to 400 kg./cu. m. these composite materials may be classified as fire retardant in the test according to DIN 4102. Obviously it is also possible in the production of the composite materials to combine a plurality of insulating layers according to this invention having different unit weights, for example of 120 kg/cu. m. and 350 kg/cu.. m.

The invention is illustrated by the following Examples in which parts are by weight.

EXAMPLE 1

A mixture is prepared within three minutes in an intensive mixer from the following components:

| | Parts |
|---|---|
| Sodium silicate solution having a concentration of 39° Baumé | 2,000 |
| Expanded polystyrene particles having a diameter of 0.2 to 3 mm. and a bulk density of 25 g./l. | 500 |
| Sodium silicofluoride | 400 |
| Talc | 400 |
| Chloroparaffin in powder form and having a chlorine content of 75% | 400 |
| Powdered antimony trioxide | 100 |

This mixture contains 85.8% by volume of expanded polystyrene particles. It is immediately introduced into a perforated metal mold, the inner walls of which are lined with a cloth, so that the loose mixture completely fills the mold. The mold has a length of 110 cm., a width of 57 cm. and a depth of 20 cm. The mixture is pressed together therein to a thickness of 13 cm. and kept in this condition by applying a metallic cover which is kept at a constant level by means of a force plug. This cover is somewhat smaller than the mold so that a gap of about 1 mm. is left between the outer edges of the cover and the walls of the mold. The mold is kept for three hours at a temperature of 70° C. and then for eight hours in a vacuum cabinet at a pressure of 50 torr. at the same temperature. After cooling, there is removed from the mold a molding which is very resistant to compression and has a unit weight of 180 g./l. The block formed is cut with a bandsaw into boards having a thickness of 2 to 4 cm. They may be used as interlayers in composite materials.

EXAMPLE 2

A loose mixture is prepared as described in Example 1 from the following components:

| | Parts |
|---|---|
| Sodium silicate solution having a concentration of 39° Baumé | 1,750 |
| Expanded polystyrene particles having a diameter of 0.2 to 2.5 mm. and a bulk density of 15 g./l. | 300 |
| Tetrachlorophthalic acid | 200 |
| Talc | 500 |
| Chloroparaffin | 200 |
| Antimony trioxide | 100 |
| Borax | 300 |

This mixture contains 86.3% by volume of expanded polystyrene particles. It is filled into the space between a wooden shuttering and a brick wall and mechanically compacted. Twenty-four hours later the wooden shuttering is removed. A layer is left adhering firmly to the brickwork. After it has dried completely, the layer has a unit weight of 213 g./l.

EXAMPLE 3

A loose mixture is prepared as described in Example 1 from the following components:

| | Parts |
|---|---|
| Sodium silicate solution having a concentration of 39° Baumé | 1,600 |
| Potassium silicate solution having a concentration of 25° Baumé | 150 |
| Expanded polystyrene particles having a diameter of 0.2 to 2.5 mm. and a bulk density of 21 g./l. | 89.25 |
| Chloroparaffin | 300 |
| Antimony trioxide | 100 |
| Magnesium silicofluoride | 250 |

This mixture contains 94.4% by volume of expanded polystyrene particles.

This mixture is filled into the mold described in Example 1, compressed to 85% of its original volume and kept for ten hours at 70° C. A hard molding is formed having a unit weight of 100 g./l. and a thermal conductivity at 0° C. of 0.035 kcal./mh° C.

EXAMPLE 4

A loose mixture is prepared as described in Example 1 from the following components:

| | Parts |
|---|---|
| Sodium silicate solution having a concentration of 39° Baumé | 1,750 |
| Closed-cell polyurethane foam which has been reduced to a particle size of 2 to 6 mm., the particles having a bulk density of 40 g./l. | 300 |
| Sodium silicofluoride | 150 |
| Tetrachlorophthalic acid | 100 |
| Talc | 300 |
| Chloroparaffin | 150 |
| Antimony trioxide | 75 |

This mixture is introduced into a wooden mold which consists of lateral frame members and which is 57 cm. in width, 110 cm. in length and 20 cm. in depth. When the frame members are removed, a loose but dimensionally stable molding is obtained which is kept for twenty-four hours at 20° C. and then for another twenty-four hours at 30° C. under a pressure of 15 mm. Hg. The finished molding has a unit weight of 375 g./l. It is parted into boards having a thickness of 4 cm. The boards are laminated on both sides with asbestos cement sheets having a thickness of 3 mm. and the laminates are tested according to DIN 4102. A duration of fire resistance of more than sixty minutes is achieved.

Similar results are obtained when using, instead of sodium silicofluoride, the same amount of potassium borofluoride.

EXAMPLE 5

A mixture is prepared at room temperature in an intensive mixer from the following components:

| | Parts |
|---|---|
| Sodium silicate solution having a concentration of 39° Baumé | 2,000 |
| Sodium silicate powder having a particle size of 0.2 to 1 mm. and a water content of 16% by weight | 200 |
| Sodium silicofluoride | 150 |
| Zinc oxide | 500 |
| Chloroparaffin | 300 |
| Antimony trioxide | 100 |
| Expanded polystyrene particles having a particle size of 2 to 6 mm. and a bulk density of 17 g./l. | 425 |

The mixture is filled into a wooden mold, smoothed and pressed down by 40% of its original depth. The mixture is left for four hours in this condition. A solid block is formed which can be removed from the mold. It is kept for two days at room temperature and five days at 75° C. Boards having a thickness of 4 cm. are cut from the block with a bandsaw.

The expanded material has a unit weight of 173 g./l., has good resistance to abrasion and compression and has a smooth surface. When it is kept in water, an increase in weight of 3.12% is observed after twenty-four hours, and its good resistance to compression remains unchanged.

The boards are used for making composite units, one layer being a sheet of asbestos cement and the other layer being a plaster board. These composite units are distinguished by very prolonged resistance to fire. The boards may be used quite generally as insulating material. The unit weight may also be considerably decreased, for example to 100 g./l., by increasing the proportion of plastics particles.

We claim:
1. A process for the production of insulating material having a light weight and a high break resistance and being capable of withstanding prolonged heating at very high temperatures which comprises mixing closed cell porous organic thermoplastic polymer particles from the group consisting of polymers of styrene, polymers of vinyl chloride, polymers of vinylidene chloride and polyurethane with an aqueous alkali metal silicate solution and a substance which is difficultly soluble in said solution and which reacts with said alkali metal silicate with precipitation of insoluble compounds, said substance being a member selected from the group consisting of silicofluorides and borofluorides of the alkali metals or alkaline earth metals, zinc oxide, tetrachlorophthalic acid, alkali metal borates, propyl acetate and phthalic anhydride, the resultant mixture when consolidated having a unit weight of 50–600 kilograms per cubic meter, and consolidating said mixture to form a compact molding.

2. A process as claimed in claim 1 wherein the mixture, prior to consolidation, is compressed to 20% to 90% of its original volume and consolidation takes place in this compressed condition.

3. A process as claimed in claim 1 wherein consolidation is carried out at elevated temperatures not exceeding the softening temperature of the polymer particles.

4. A process for the production of insulating material having a light weight and a high break resistance and being capable of withstanding prolonged heating at very high temperatures which comprises mixing closed cell porous organic thermoplastic polymer particles from the group consisting of polymers of styrene, polymers of vinyl chloride, polymers of vinylidene chloride and polyurethane, with an aqueous alkali metal silicate solution and a substance which is difficultly soluble in said solution and which reacts with said alkali metal silicate with precipitation of insoluble compounds, said substance being a member selected from the group consisting of silicofluorides and borofluorides of the alkali metals or alkaline earth metals, zinc oxide, tetrachlorophthalic acid, alkali metal borates, propyl acetate and phthalic anhydride, the resultant mixture when consolidated having a unit weight of 50 to 250 kilograms per cubic meter, and consolidating said mixture to form a compact molding.

5. A product resulting from the process of claim 1.

6. A process as claimed in claim 1 in which said mixing is carried out at temperatures sufficiently low to prevent setting during mixing and the consolidated mixture is heated to 50° C. to 90° C. until it has set.

7. A process as claimed in claim 1 in which said polymer particles consist essentially of expanded polystyrene particles.

8. A process as claimed in claim 1 in which said polymer particles consist essentially of particles of polyurethane foam.

9. A product resulting from the process of claim 7.

10. A product resulting from the process of claim 8.

References Cited

UNITED STATES PATENTS 3,429,836  2/1969  Stastny et al. _____ 260—2.5B

MURRAY TILLMAN, Primary Examiner

M. FOELAK, Assistant Examiner

U.S. Cl. X.R.

106—75, 84, 86, 122; 260—37, 41, 41.5, 45.7, 45.75